US009341490B1

(12) United States Patent
Carter et al.

(10) Patent No.: US 9,341,490 B1
(45) Date of Patent: May 17, 2016

(54) NAVIGATION SYSTEM WITH SPELLING ERROR DETECTION MECHANISM AND METHOD OF OPERATION THEREOF

(71) Applicant: Telenav, Inc., Sunnyvale, CA (US)

(72) Inventors: Casey Carter, Sunnyvale, CA (US); Kristen Kam, Sunnyvale, CA (US); Gregory Stewart Aist, San Mateo, CA (US)

(73) Assignee: TELENAV, INC., Santa Clara, CA (US)

( * ) Notice: Subject to any disclaimer, the term of this patent is extended or adjusted under 35 U.S.C. 154(b) by 0 days.

(21) Appl. No.: 14/657,590

(22) Filed: Mar. 13, 2015

(51) Int. Cl.
*G01C 21/34* (2006.01)

(52) U.S. Cl.
CPC ..................................... *G01C 21/34* (2013.01)

(58) Field of Classification Search
CPC ................ G01C 21/34; G06F 17/2785; G06F 17/30395; G06F 17/2827; G06F 17/30616; G06F 17/273; H04L 63/14; G06Q 30/02
See application file for complete search history.

(56) References Cited

U.S. PATENT DOCUMENTS

| 5,062,143 | A | 10/1991 | Schmitt | |
|---|---|---|---|---|
| 6,430,539 | B1 * | 8/2002 | Lazarus | G06Q 30/02 705/14.1 |
| 9,037,967 | B1 * | 5/2015 | Al-Jefri | G06F 17/273 715/257 |
| 2009/0055394 | A1 * | 2/2009 | Schilit | G06F 17/30616 |
| 2009/0288164 | A1 * | 11/2009 | Adelstein | H04L 63/14 726/22 |
| 2011/0093254 | A1 * | 4/2011 | Kuhn | G06F 17/2827 704/2 |
| 2012/0197889 | A1 * | 8/2012 | Mineno | G06F 17/30395 707/737 |
| 2014/0058723 | A1 * | 2/2014 | Shen | G06F 17/2785 704/9 |

OTHER PUBLICATIONS

Zamora et al., "The Use of Trigram Analysis for Spelling Error Detection", Information Processing & Management, vol. 17, No. 6, pp. 305-316, 1981.

\* cited by examiner

*Primary Examiner* — James Trammell
*Assistant Examiner* — James E Stroud
(74) *Attorney, Agent, or Firm* — IP Investment Law Group

(57) ABSTRACT

A navigation system includes a control unit configured to identify map data for a geographic region; generate an n-gram frequency set based on the map data and the geographic region; calculate a target occurrence rate for detecting one or more potential spelling errors in the map data based on the n-gram frequency set; and a communication interface, coupled to the control unit, and configured to communicate the target occurrence rate.

20 Claims, 6 Drawing Sheets

NAVIGATION SYSTEM WITH SPELLING ERROR DETECTION MECHANISM AND METHOD OF OPERATION THEREOF

TECHNICAL FIELD

The present invention relates generally to a navigation system, and more particularly to a system with a spelling error detection mechanism.

BACKGROUND

Modern portable consumer and industrial electronics, especially client devices such as navigation systems, cellular phones, portable digital assistants, and combination devices, are providing increasing levels of functionality to support modern life including location-based information services. Research and development in the existing technologies can take myriad directions.

As users become more empowered with the growth of portable location-based service devices, new and old paradigms begin to take advantage of this new device space. One existing approach is to provide map or navigation information including driving directions, point-of-interest (POI) information, or a combination thereof. However, such map or navigation information is often plagued by misspellings which can compromise the usefulness of such information for users.

Thus, a need still remains for a navigation system with a spelling error detection mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a navigation system, including a control unit configured to identify map data for a geographic region; generate an n-gram frequency set based on the map data and the geographic region; calculate a target occurrence rate for detecting one or more potential spelling errors in the map data based on the n-gram frequency set; and a communication interface, coupled to the control unit, and configured to communicate the target occurrence rate.

An embodiment of the present invention provides a method of operation of a navigation system including identifying, with a control unit, a map data for a geographic region; generating an n-gram frequency set based on the map data and the geographic region; calculating a target occurrence rate for detecting one or more potential spelling errors in the map data based on the n-gram frequency set; and communicating, with a communication interface coupled to the control unit, the target occurrence rate.

An embodiment of the present invention provides a non-transitory computer readable medium including identifying a map data for a geographic region; generating an n-gram frequency set based on the map data and the geographic region; calculating a target occurrence rate for detecting one or more potential spelling errors in the map data based on the n-gram frequency set; and communicating the target occurrence rate.

Certain embodiments of the invention have other steps or elements in addition to or in place of those mentioned above. The steps or element will become apparent to those skilled in the art from a reading of the following detailed description when taken with reference to the accompanying drawings.

DETAILED DESCRIPTION

Figure 1:
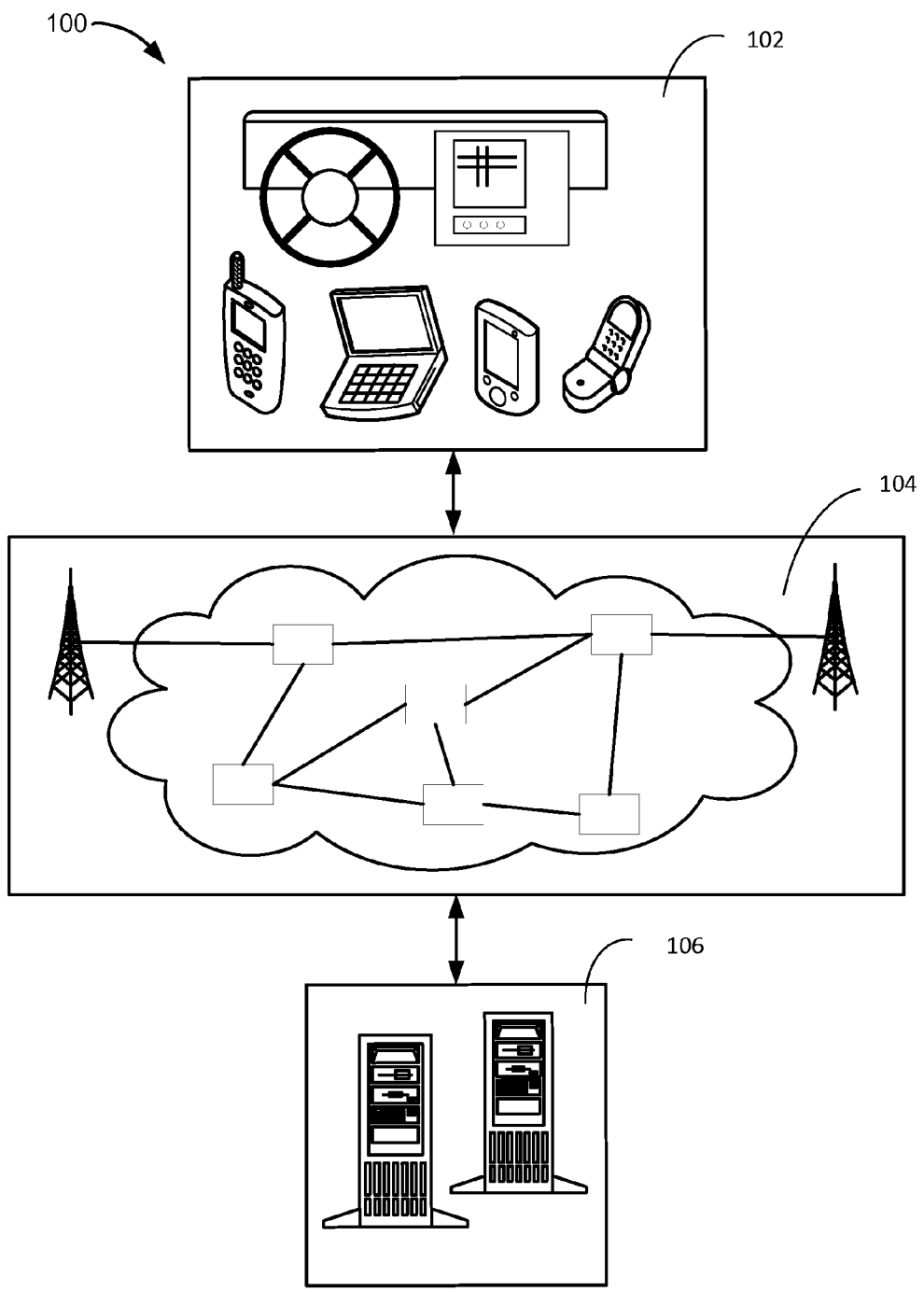
FIG. 1 is a navigation system with a spelling error detection mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGS. Similarly, although the views in the drawings for ease of description generally show similar orientations, this depiction in the FIGS. is arbitrary for the most part. Generally, the invention can be operated in any orientation.

One skilled in the art would appreciate that the format with which navigation information is expressed is not critical to some embodiments of the invention. For example, in some embodiments, navigation information is presented in the format of (X, Y), where X and Y are two coordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein comprises the navigation information described as well as information relating to point of interest to the user, such as local business, hours of businesses, types of businesses, advertised specials, traffic information, maps, local events, and nearby community or personal information.

The term "module" referred to herein can include software, hardware, or a combination thereof of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the apparatus claims sections below, the modules are deemed to include hardware circuitry for the purposes and the scope of the apparatus claims.

Referring now to FIG. 1, therein is shown a navigation system 100 with a spelling error detection mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or a device incorporated with a vehicle. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or a combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
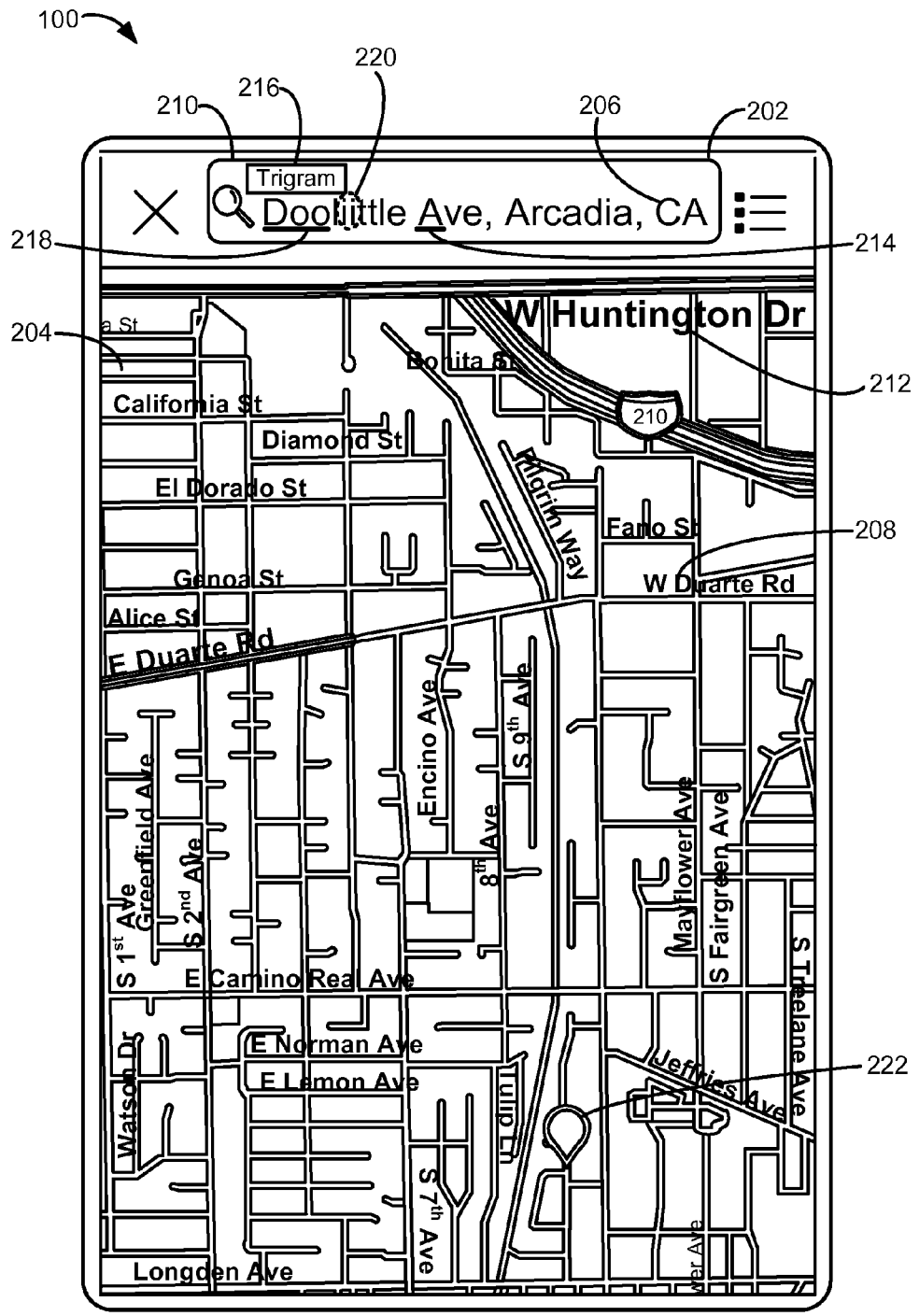
FIG. 2 is an example of a display on a display interface of the navigation system.

Referring now to FIG. 2, therein is shown an example of a display on a display interface 202 of the navigation system 100. The display interface 202 can include a map display portion 204 depicting a geographic region 206. The map display portion 204 is a portion of a user interface displaying a map or other geographic information. The map display portion 204 can include a graphic user interface (GUI), an application window, a hardware display, a portion therein, or a combination thereof. For example, the map display portion 204 can include a two-dimensional (2D) map graphic, a three-dimensional (3D) map graphic, a satellite map graphic, a street-view map graphic, or a combination thereof. The map display portion 204 can take up the entirety of the display interface 202 or a portion thereof.

In addition, the map display portion 204 can be presented within the GUI of a navigation application or as part of a separate mapping application. For example, the map display portion 204 can be presented within a frame or window of the GUI of the navigation application.

The geographic region 206 is a representation of a geographic area or location enclosed by a boundary or regional delineation. The geographic region 206 can include a representation of a country, a province, a state, a county, a city, a municipality, a neighborhood, a portion therein, or a combination thereof. The geographic region 206 can be depicted in map-form through the map display portion 204 of the display interface 202.

The map display portion 204 can depict the geographic region 206 using map data 208. The map data 208 can include data or information concerning the geographic region 206, points-of-interest (POIs) within the geographic region 206, paths or roads within the geographic region 206, or a combination thereof.

In one example embodiment, the navigation system 100 can retrieve or receive the map data 208 from a POI database, a Geographic Information System (GIS) database, a Global Navigation Satellite System (GNSS) database, a Global Positioning System (GPS) database, a web feed, an extensible markup language (XML) feed such as a rich site summary (RSS) feed or an Atom feed, or a combination thereof. In another example embodiment, the navigation system 100 can retrieve or receive the map data 208 from a user-generated map database such as an OpenStreetMap™ database.

The map data 208 can include a target segment 212. The target segment 212 is a string of text, symbols, numbers, spaces, or a combination thereof for analysis by the navigation system 100. The target segment 212 can be associated with the geographic region 206. The target segment 212 can include one or more words or phrases associated with POIs or transport paths within the geographic region 206.

As a more specific example, the target segment 212 can include the phrase "West_Huntington Dr.,_Arcadia,_CA" including all spaces and punctuation marks. In this and other examples, the underscore (_) will be used to represent a blank space. As another example, the target segment 212 can include the words "West_Huntington" with one space separating the words "West" and "Huntington." As yet another example, the target segment 212 can be the word "Huntington."

The target segment 212 can include one or more characters 214. The characters 214 can include letters, numbers, symbols, spaces, or a combination thereof. The target segment 212 can also include one or more n-grams 216.

The n-grams 216 are portions of words or phrases with two or more consecutive instances of the characters 214. The 'n' of the n-grams 216 can represent an n-gram size 218. The n-gram size 218 is the number of the characters 214 in each of the n-grams 216. The n-grams 216 can include bigrams, trigrams, quadrigrams, or pentagrams corresponding to the n-gram size 218 of 2, 3, 4, or 5 characters, respectively.

As a more specific example, the word "West" can include two overlapping instances of the trigrams "Wes" and "est". As yet another example, the words "Huntington Ave." can include 12 overlapping instances of the quadrigrams "Hunt", "unti", "ntin", "ting", "ingt", "ngto", "gton", "ton_", "on_A", "n_Av", "_Ave", and "Ave."

The display interface 202 can also include a search query 210. The search query 210 can include one or more keywords or phrases used to retrieve information from the navigation system 100. The search query 210 can include one or more instances of the target segment 212, a portion therein, or a combination thereof. As depicted in FIG. 2, the search query 210 can also include one or more potential spelling errors 220. The search query 210 can include a text query, an audio or voice query, or a combination thereof.

The potential spelling errors 220 are possible misspellings associated with words or phrases included in the map data 208 or the search query 210. The potential spelling errors 220 can be associated with a name or an identifier.

The potential spelling errors 220 can include errors associated with the arrangement of the characters 214 making up the target segment 212. For example, the potential spelling errors 220 can include errors associated with the name or the identifier of a geographic location, such as a street name, a neighborhood name, a park name, a landmark name, or a combination thereof. Also, for example, the potential spelling errors 220 can be associated with an entity such as a POI or a business.

As will be discussed below, the navigation system 100 can detect the potential spelling errors 220 based on the n-grams 216 of the target segment 212 or the search query 210. For example, the navigation system 100 can detect the potential spelling errors 220 by communicating the potential spelling errors 220 to a user of the navigation system 100. As a more specific example, the navigation system 100 can detect the potential spelling errors 220 by highlighting the potential spelling errors 220 in one or more of the n-grams 216. The navigation system 100 can detect the potential spelling errors 220 for further processing or determination.

The display interface 202 can also display a current location 222. The current location 222 is a present geographic position or coordinates of a device in the navigation system 100. For example, the current location 222 can be the present geographic position or coordinates of the first device 102 of FIG. 1.

Figure 3:
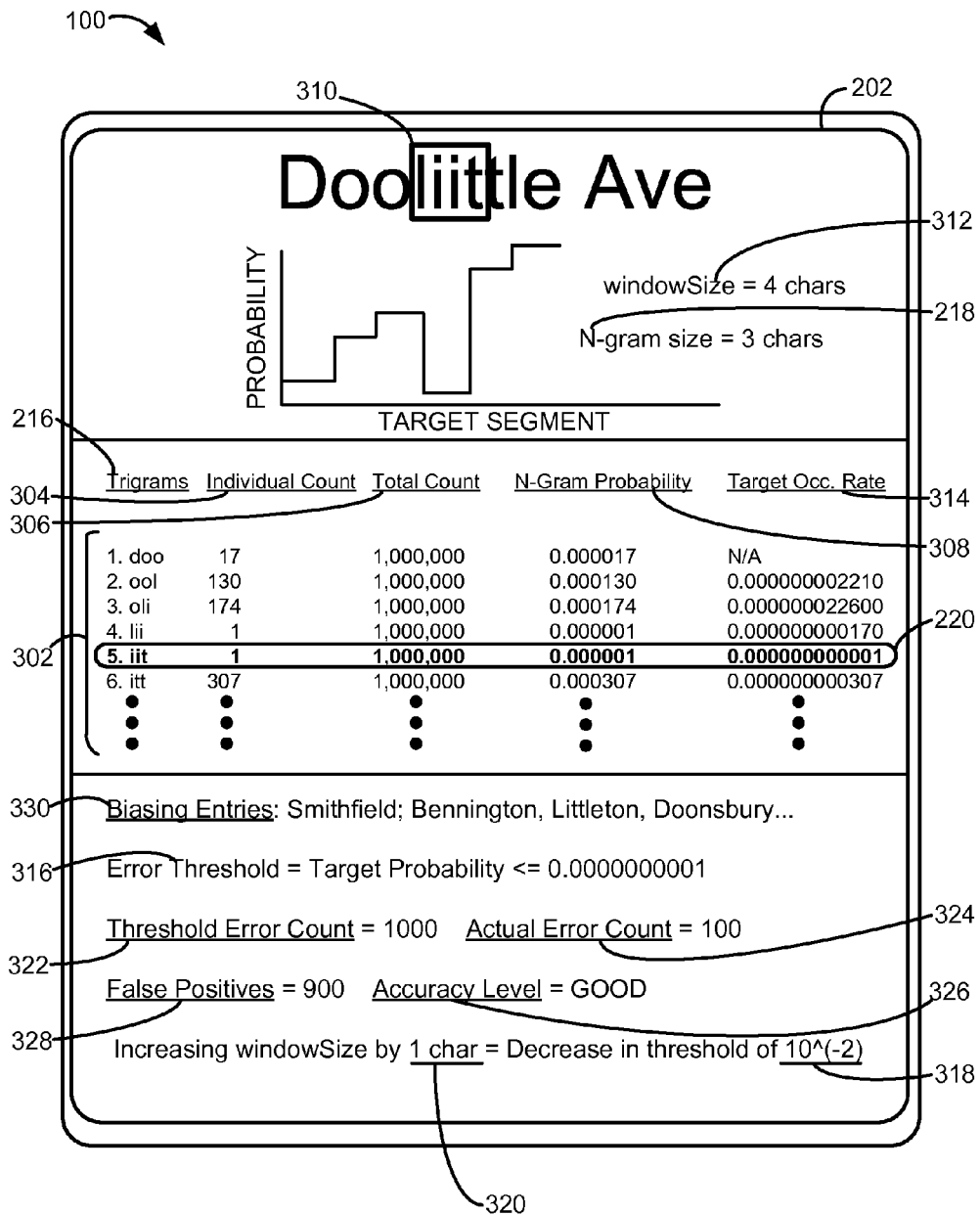
FIG. 3 is an example of another display on the display interface of the navigation system.

Referring now to FIG. 3, therein is shown an example of another display on the display interface 202 of the navigation system 100. The display interface 202 can depict an n-gram frequency set 302. The n-gram frequency set 302 is a dataset for organizing statistical data or information concerning the map data 208 of FIG. 2. The n-gram frequency set 302 can include statistical data concerning the n-grams 216 in the map data 208 such as rates of occurrence, probabilities, or a combination thereof.

The n-gram frequency set 302 can also include an individual n-gram count 304 for each of the n-grams 216 and a total n-gram count 306. The individual n-gram count 304 is the number of times a corresponding instance of the n-grams 216 appears in words or phrases in the map data 208. For example, one of the n-grams 216 can be the trigram "ong". Continuing with this example, the map data 208 can be a list of all street names in the city of Los Angeles. In this example, the individual n-gram count 304 can be the number of times the trigram "ong" appears in street names in the city of Los Angeles. Moreover, in this example, the total n-gram count 306 can be the total number of trigrams in all street names in the city of Los Angeles.

The navigation system 100 can use information from the n-gram frequency set 302 to calculate n-gram probabilities 308. As will be discussed below, the navigation system 100 can calculate the n-gram probabilities 308 by dividing the individual n-gram count 304 by the total n-gram count 306.

The navigation system 100 can also determine a target window 310. The target window 310 represents a length of character strings for analyzing the target segment 212. The navigation system 100 can use the n-grams 216 in the target window 310 to detect the potential spelling errors 220. The target window 310 can have a window size 312.

The window size 312 is the actual number of the characters 214 in the target window 310. The window size 312 can equal or exceed the number of the characters 214 represented by the 'n' of the n-grams 216 or the n-gram size 218. For example, the n-grams 216 can be trigrams and the window size 312 can include three or more characters.

Also, for example, the target segment 212 can include the words "Doe_Ave" and the window size 312 of the target window 310 can be five characters. In this example, the target window 310 can encompass portions of the target segment 212 including "Doe_A", "oe_Av", and "e_Ave". Also, in this example, the target window 310 encompassing the characters "Doe_A" can also include the trigrams "Doe", "oe_", and "e_A".

The navigation system 100 can calculate a target occurrence rate 314 by multiplying the n-gram probabilities 308 of the n-grams 216 within the target window 310. The target occurrence rate 314 is a numeric value representing the likelihood of the target window 310 containing one or more of the potential spelling errors 220. Continuing with the example above, the target occurrence rate 314 of the target window 310 encompassing "Doe_A" can be the product of the n-gram probabilities 308 for trigrams "Doe," "oe_," and "e_A."

As will be discussed below, the navigation system 100 can compare the target occurrence rate 314 with an error threshold 316 for detecting the potential spelling errors 220 in the map data 208. The error threshold 316 is a numeric value representing a minimum threshold for detecting spelling errors within the map data 208. The navigation system 100 can detect the potential spelling errors 220 in the target segment 212 when the target occurrence rate 314 is below the error threshold 316.

The error threshold 316 can be predetermined by the navigation system 100. In addition, the navigation system 100 can adjust the error threshold 316. For example, the navigation system 100 can decrease the error threshold 316 by two or more orders-of-magnitude 318 when the window size 312 of the target window 310 is increased by a singular character 320. The singular character 320 refers to one instance of the characters 214 making up the target segment 212.

The navigation system 100 can set the error threshold 316 to satisfy an artificial error count 322. The artificial error count 322 is an adjustable threshold number of spelling errors for determining the accuracy of the map data 208. For example, the navigation system 100 can adjust the error threshold 316 until the potential spelling errors 220 satisfies the artificial error count 322.

The navigation system 100 can also determine an actual error count 324 from the potential spelling errors 220. The actual error count 324 can be the number of genuine spelling errors included in the potential spelling errors 220 detected by the navigation system 100. As will be discussed below, the navigation system 100 can determine the actual error count 324 by removing false positive results 328 from the potential spelling errors 220. The false positive results 328 are infrequent but correctly spelled instances of the target segment 212 detected by the navigation system 100 as the potential spelling errors 220.

The navigation system 100 can also determine an accuracy level 326 of the map data 208 based on the actual error count 324. The accuracy level 326 is a measure of the quality of the map data 208 based on errors detected in the map data 208. For example the navigation system 100 can determine the accuracy level 326 of map data retrieved from a user-generated map database based on the actual error count 324.

The display interface 202 can also depict one or more biasing entries 330. The biasing entries 330 are correctly spelled words or phrases added to the map data 208 to increase the frequency of the n-grams 216 included in the biasing entries 330. For example, the geographic region 206 of FIG. 2 can be a predominately German neighborhood with street names derived from German surnames. In this example, the navigation system 100 can incorporate common German words representing the biasing entries 330 into the map data 208 to increase the individual n-gram count 304 of the n-grams 216 in these common German words.

Figure 4:
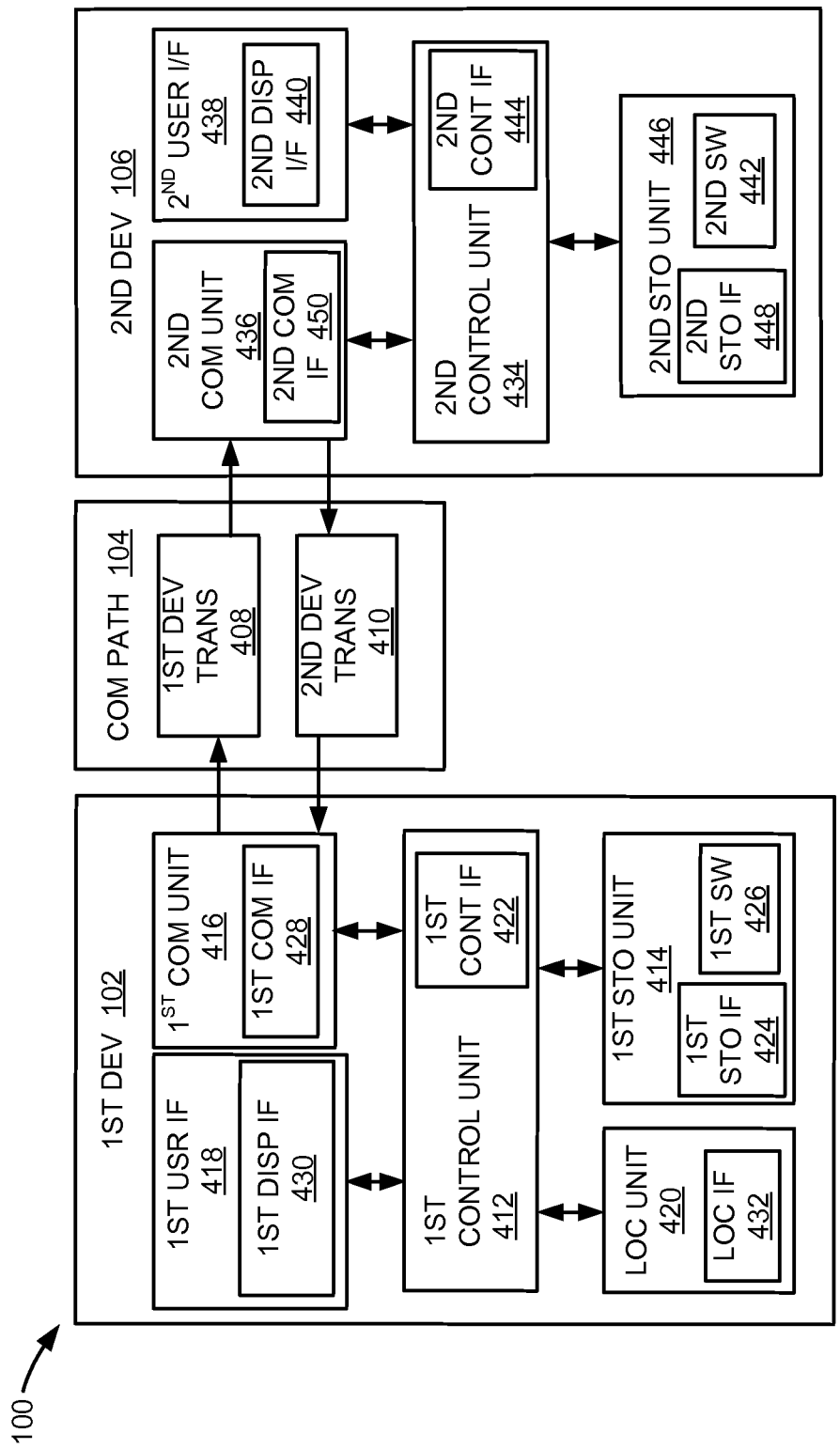
FIG. 4 is an exemplary block diagram of the navigation system.

Referring now to FIG. 4 therein is shown an exemplary block diagram of the navigation system 100. The navigation system 100 can include the first device 102, the communication path 104, and the second device 106. The first device 102 can send information in a first device transmission 408 over the communication path 104 to the second device 106. The second device 106 can send information in a second device transmission 410 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 412, a first storage unit 414, a first communication unit 416, a first user interface 418, and a location unit 420. The first device 102 can be similarly described by the first device 102.

The first control unit 412 can include a first control interface 422. The first control unit 412 can execute a first software 426 to provide the intelligence of the navigation system 100. The first control unit 412 can be implemented in a number of different manners. For example, the first control unit 412 can be a processor, an embedded processor, a microprocessor, a hardware control logic, a hardware finite state machine (FSM), a digital signal processor (DSP), or a combination thereof. The first control interface 422 can be used for communication between the first control unit 412 and other functional units in the first device 102. The first control interface 422 can also be used for communication that is external to the first device 102.

The first control interface 422 can receive information from the other functional units or from external sources, or can transmit information to the other functional units or to external destinations. The external sources and the external destinations refer to sources and destinations external to the first device 102.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The location unit 420 can generate a location or movement information, including a geographic position, a heading, an inertial orientation, a speed, an altitude, or a combination thereof or a change therein of the first device 1002. The location unit 420 can be implemented in many ways.

For example, the location unit 420 can function as at least a part of a global positioning system (GPS), a global navigation satellite system (GLONASS), an inertial navigation system, a cellular-tower location system, a pressure location system, or any combination thereof. The location unit 220 can include an accelerometer, a gyroscope, an airspeed indicator, a compass, a heading indicator, an altimeter, an automatic dependent surveillance-broadcast (ADS-B) transponder, or a combination thereof.

The location unit 420 can include a location interface 432. The location interface 432 can be used for communication between the location unit 420 and other functional units in the first device 102. The location interface 432 can also be used for communication that is external to the first device 102.

The location interface 432 can receive information from the other functional units or from external sources, or can transmit information to the other functional units or to external destinations. The external sources and the external destinations refer to sources and destinations external to the first device 102.

The location interface 432 can include different implementations depending on which functional units or external units are being interfaced with the location unit 420. The location interface 432 can be implemented with technologies and techniques similar to the implementation of the first control interface 422.

The first storage unit 414 can store the first software 426. The first storage unit 414 can also store the relevant information, such as advertisements, point of interest (POI), navigation routing entries, reviews/ratings, feedback, traffic patterns, or any combination thereof.

The first storage unit 414 can be a volatile memory, a nonvolatile memory, an internal memory, an external memory, or a combination thereof. For example, the first storage unit 414 can be a nonvolatile storage such as nonvolatile random access memory (NVRAM), Flash memory, disk storage, or a volatile storage such as static random access memory (SRAM).

The first storage unit 414 can include a first storage interface 424. The first storage interface 424 can be used for communication between the first storage unit 414 and other functional units in the first device 102. The first storage interface 424 can also be used for communication that is external to the first device 102.

The first storage interface 424 can receive information from the other functional units or from external sources, or can transmit information to the other functional units or to external destinations. The external sources and the external destinations refer to sources and destinations external to the first device 102.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the first device 102. For example, the first communication unit 416 can permit the first device 102 to communicate with the second device 106 of FIG. 1, an attachment, such as a peripheral device or a computer desktop, and the communication path 104.

The first communication unit 416 can also function as a communication hub allowing the first device 102 to function as part of the communication path 104 and not limited to be an end point or terminal unit to the communication path 104. The first communication unit 416 can include active and passive components, such as microelectronics or an antenna, for interaction with the communication path 104.

The first communication unit 416 can include a first communication interface 428. The first communication interface 428 can be used for communication between the first communication unit 416 and other functional units in the first device 102. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, or any combination thereof to provide data and communication inputs.

The first user interface 418 can include a first display interface 430, or a combination thereof. The first display interface 430 can include a display, a projector, a video screen, a speaker, or any combination thereof.

The first control unit 412 can operate the first user interface 418 to display information generated by the navigation system 100. The first control unit 412 can also execute the first software 426 for the other functions of the navigation system 100, including receiving location information from the location unit 420. The first control unit 412 can further execute the first software 426 for interaction with the communication path 104 via the first communication unit 416.

The second device 106 can be optimized for implementing the present invention in a multiple device embodiment with the first device 102. The second device 106 can provide the additional or higher performance processing power compared to the first device 102. The second device 106 can include a second control unit 434, a second communication unit 436, and a second user interface 438.

The second user interface 438 allows the user to interface and interact with the second device 106. The second user interface 438 can include an input device and an output device. Examples of the input device of the second user interface 438 can include a keypad, a touchpad, soft-keys, a keyboard, a microphone, or any combination thereof to provide data and communication inputs. Examples of the output device of the second user interface 438 can include a second display interface 440. The second display interface 440 can include a display, a projector, a video screen, a speaker, or any combination thereof.

The second control unit 434 can execute a second software 442 to provide the intelligence of the second device 106 of the navigation system 100. The second software 442 can operate in conjunction with the first software 426. The second control unit 434 can provide additional performance compared to the first control unit 412.

The second control unit 434 can operate the second user interface 438 to display information. The second control unit 434 can also execute the second software 442 for the other functions of the navigation system 100, including operating the second communication unit 436 to communicate with the first device 102 over the communication path 104.

The second control unit 434 can be implemented in a number of different manners. For example, the second control unit 434 can be a processor, an embedded processor, a microprocessor, a hardware control logic, a hardware finite state machine (FSM), a digital signal processor (DSP), or a combination thereof.

The second control unit 434 can include a second controller interface 444. The second controller interface 444 can be used for communication between the second control unit 434 and other functional units in the second device 106. The second controller interface 444 can also be used for communication that is external to the second device 106.

The second controller interface 444 can receive information from the other functional units or from external sources, or can transmit information to the other functional units or to external destinations. The external sources and the external destinations refer to sources and destinations external to the second device 106.

The second controller interface 444 can be implemented in different ways and can include different implementations depending on which functional units or external units are being interfaced with the second controller interface 444. For example, the second controller interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the relevant information, such as advertisements, points of interest (POIs), navigation routing entries, reviews/ratings, feedback, traffic patterns, or any combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the navigation system 100 is shown with the second storage unit 446 as a single hierarchy storage system, although it is understood that the navigation system 100 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as non-volatile random access memory (NVRAM), Flash memory, disk storage, or a volatile storage such as static random access memory (SRAM).

The second storage unit 446 can include a second storage interface 448. The second storage interface 448 can be used for communication between the second storage unit 446 and other functional units in the second device 106. The second storage interface 448 can also be used for communication that is external to the second device 106.

The second storage interface 448 can receive information from the other functional units or from external sources, or can transmit information to the other functional units or to external destinations. The external sources and the external destinations refer to sources and destinations external to the second device 106.

The second storage interface 448 can include different implementations depending on which functional units or external units are being interfaced with the second storage unit 446. The second storage interface 448 can be implemented with technologies and techniques similar to the implementation of the second controller interface 444.

The second communication unit 436 can enable external communication to and from the second device 106. For example, the second communication unit 436 can permit the second device 106 to communicate with the first device 102 over the communication path 104.

The second communication unit 436 can also function as a communication hub allowing the second device 106 to function as part of the communication path 104 and not limited to be an end point or terminal unit to the communication path 104. The second communication unit 436 can include active and passive components, such as microelectronics or an antenna, for interaction with the communication path 104.

The second communication unit 436 can include a second communication interface 450. The second communication interface 450 can be used for communication between the second communication unit 436 and other functional units in the second device 106. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second controller interface 444.

The first communication unit 416 can couple with the communication path 104 to send information to the second device 106 in the first device transmission 408. The second device 106 can receive information in the second communication unit 436 from the first device transmission 408 of the communication path 104.

The second communication unit 436 can couple with the communication path 104 to send information to the first device 102 in the second device transmission 410. The first device 102 can receive information in the first communication unit 416 from the second device transmission 410 of the communication path 104. The navigation system 100 can be executed by the first control unit 412, the second control unit 434, or a combination thereof.

For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 420, although it is understood that the second device 106 can also operate the location unit 420.

Figure 5:
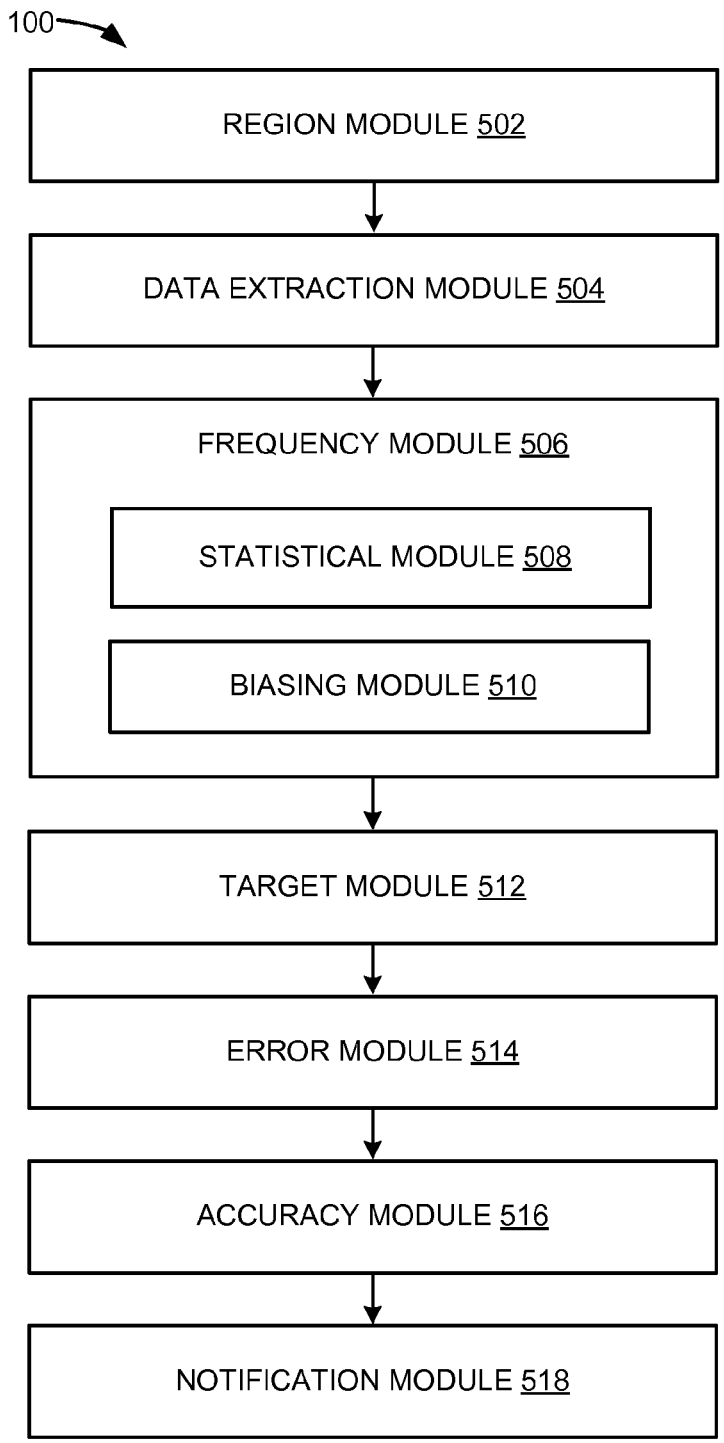
FIG. 5 is a control flow of the navigation system.

Referring now to FIG. 5, therein is shown a control flow of the navigation system 100 with a spelling error detection mechanism. The navigation system 100 can include a region module 502, a data extraction module 504, a frequency module 506, a target module 512, an error module 514, an accuracy module 516, a notification module 518, or a combination thereof.

The region module 502 can be coupled to the data extraction module 504. The data extraction module 504 can be further coupled to the frequency module 506, the frequency module 506 can be further coupled to the target module 512, the target module 512 can be further coupled to the error module 514, the error module 514 can be further coupled to the accuracy module 516, and the accuracy module 516 can be further coupled to the notification module 518.

The modules can be coupled by having the input of one module connected to the output of another module as shown in FIG. 5. The modules can be coupled by using wired or wireless connections, the communication path 104 of FIG. 1, instructional steps, or a combination thereof. The modules can be coupled directly, without any intervening structures other than the structure providing the direct connection. The modules can further be coupled indirectly, through a shared connection or other functional structures between the coupled modules.

The region module 502 is configured to determine the geographic region 206 of FIG. 2. The region module 502 can determine the geographic region 206 based on the search query 210 of FIG. 2, the current location 222 of FIG. 2, the map display portion 204 of FIG. 2, a user input, or a combination thereof.

The region module 502 can determine the geographic region 206 by parsing the search query 210 for a name or coordinates of the geographic region 206. The region module 502 can parse the search query 210 entered by a user of the navigation system 100, received from another device in the navigation system 100, or a combination thereof.

The region module 502 can parse the search query 210 by comparing one or more words or numbers of the search query 210 with a set of known geographic identifiers or markers from a GIS database, a Geographic Names Information System (GNIS) database, GeoNames database, a postal code database, or a combination thereof. For example, the region module 502 can determine the geographic region 206 as a state when an abbreviation in the search query 210 matches a state abbreviation included as part of the GNIS database.

The region module 502 can determine multiple instances of the geographic region 206 when parsing the search query 210. For example, the search query 210 can include a city name and a state abbreviation. When the region module 502 identifies multiple instances of the geographic region 206, the region module 502 can determine the geographic region 206 by selecting the smallest area or region out of the multiple regions or areas. For example, the region module 502 can determine the geographic region 206 as a city when the search query 210 includes both a city name and a state abbreviation.

The region module 502 can determine the geographic region 206 based on the current location 222. The region module 502 can determine the geographic region 206 as an area or region surrounding the current location 222. The region module 502 can determine the geographic region 206 by establishing a geo-fence around the current location 222. The geo-fence is a virtual perimeter circumscribing a representation of a geographic area or location in the real world. The geo-fence can include a circle, an ellipsoid, a polygon, or a combination thereof. The size of the geo-fence can be defined by a distance segment, such as a radius, stemming from a center or reference point. The current location 222 can represent the center point of the geo-fence.

The region module 502 can determine the geographic region 206 as an area or region within the geo-fence. For example, the region module 502 can determine the geographic region 206 as the area within a 25 mile radius of the current location 222.

The region module 502 can also determine the geographic region 206 based on the map display portion 204. The region module 502 can determine the geographic region 206 as an area or location included in the map display portion 204. The region module 502 can determine the geographic region 206 as the area or location currently displayed on the display interface 202 of FIG. 2.

The region module 502 can determine a new instance of the geographic region 206 when the area or location currently displayed on the display interface 202 changes. For example, the display interface 202 can change due to a user input or based on interactions with another device coupled to the navigation system 100. Also for example, the display interface 202 or the map display portion 204 can be set or changed according to a predetermined order, such as for testing purposes.

For example, the map display portion 204 can include one or more map tiles, map vectors, map raster files, or a combination hereof for depicting a geographic area or location in the real world. The map display portion 204 can determine the geographic region 206 as the area or location depicted in the map tiles, the map vectors, the map raster files, or a combination thereof.

The region module 502 can also determine the geographic region 206 based on a user input. For example, the region module 502 can determine the geographic region 206 when a user of the first device 102, the second device 106, or a combination thereof communicates the name or the coordinates of the geographic region 206 to the navigation system 100 in response to a text or audio prompt. In addition, the region module 502 can determine the geographic region 206 when the user selects the geographic region 206 from a drop down menu.

The region module 502 can be part of the first software 426 of FIG. 4, the second software 442 of FIG. 4, or a combination thereof. The first control unit 412 of FIG. 4 can execute the first software 426, the second control unit 434 of FIG. 4 can execute the second software 442, or a combination thereof to determine the geographic region 206.

Moreover, the region module 502 can also communicate the geographic region 206 between devices through the first communication unit 416 of FIG. 4, the second communication unit 436 of FIG. 4, or a combination thereof. After determining the geographic region 206, the control flow can pass from the region module 502 to the data extraction module 504.

The data extraction module 504 is configured to identify the map data 208 of FIG. 2 for the geographic region 206. The data extraction module 504 can identify the map data 208 for the geographic region 206 by extracting data or information corresponding to POIs, streets, roadways, landmarks, or a combination thereof located within the geographic region 206. The data extraction module 504 can extract data or information by identifying a subset of data or information from a map or navigation database corresponding to the POIs, streets, roadways, landmarks, or a combination thereof within the geographic region 206. For example, the map data 208 can include name or contextual information concerning POIs, streets, roadways, landmarks, or a combination thereof located on or within a boundary of the geographic region 206. As a more specific example, the map data 208 can include street names, highway names, landmark names, business names, or a combination thereof.

The data extraction module 504 can extract the map data 208 by retrieving or receiving information from one or more GIS databases, GNIS databases, GPS databases, user-generated map databases, or a combination thereof. For example, the data extraction module 504 can extract the map data 208 as a comma-separated values (CSV) file, a plain text file, a rich-text file, or a combination thereof. As a more specific example, the data extraction module 504 can extract the map data 208 by downloading a CSV file concerning the geographic region 206 from the OpenStreetMap™ database.

The data extraction module 504 can also organize the map data 208 based on municipal or geographic divisions or boundaries. For example, the data extraction module 504 can organize the map data 208 based on neighborhoods, communities, development plans, or a combination thereof. In addition, the data extraction module 504 can apply one or more text recognition or machine learning algorithms to organize the map data 208 based on themes or linguistic derivations.

For example, the data extraction module 504 can apply a text recognition algorithm to street names from a particular neighborhood and determine the street names are named after flowers or trees. As a more specific example, the data extraction module 504 can determine the street names from a particular neighborhood are named after redwood trees.

As an additional example, the data extraction module 504 can apply the text recognition algorithm to street names from a county and determine the street names are derived from the Spanish language. The data extraction module 504 can tag words or phrases in the map data 208, including street names, landmark names, POI names, or a combination thereof, with their thematic or linguistic derivations to organize the map data 208.

The data extraction module 504 can be part of the first software 426, the second software 442, or a combination thereof. The first control unit 412 can execute the first software 426, the second control unit 434 can execute the second software 442, or a combination thereof to identify the map data 208.

Moreover, the data extraction module 504 can also communicate the map data 208 between devices through the first communication unit 416, the second communication unit 436, or a combination thereof. After identifying the map data 208, the control flow can pass from the data extraction module 504 to the frequency module 506.

The frequency module 506 is configured to generate the n-gram frequency set 302 of FIG. 3 for calculating a likelihood of errors in the map data 208. The frequency module 506 can generate the n-gram frequency set 302 based on the map data 208, the geographic region 206, or a combination thereof.

The frequency module 506 can include a statistical module 508, a biasing module 510, or a combination thereof. The statistical module 508 is configured to calculate the individual n-gram count 304 of FIG. 3, the total n-gram count 306 of FIG. 3, the n-gram probabilities 308 of FIG. 3, or a combination thereof based on the map data 208. The statistical module 508 can calculate the individual n-gram count 304, the total n-gram count 306, the n-gram probabilities 308, or a combination thereof for generating the n-gram frequency set 302.

The statistical module 508 can calculate the individual n-gram count 304 by determining the n-gram size 218 of FIG. 2. The statistical module 508 can determine the n-gram size 218 based on the geographic region 206, a language or dialect used in the geographic region 206, a user input, a device input, or a combination thereof.

For example, the statistical module 508 can determine the n-gram size 218 to be three for using trigrams of three characters to analyze words of phrases in the English language. In this example, trigrams can be used to analyze the map data 208 of English-speaking regions. Also, for example, the statistical module 508 can determine the n-gram size 218 to be five for using pentagrams of five characters to analyze words or phrases in Deutsch or other Germanic languages. As an additional example, bigrams of two characters can be used to analyze words or phrases in pinyin Chinese.

The statistical module 508 can determine the n-gram size 218 based on size associations predetermined by the navigation system 100. The navigation system 100 can associate the n-gram size 218 with a predominant language or dialect of the geographic region 206. The navigation system 100 can make such associations based on average word lengths, average syllable counts per word, grammatical conventions, or a combination thereof.

For example, the navigation system 100 can associate trigrams of three characters with the map data 208 from English-speaking regions. Also, for example, the navigation system 100 associate trigrams of three characters with the map data 208 from regions or locations with predominantly English-derived words or phrases.

In addition, the statistical module 508 can determine the n-gram size 218 based on a user input, a device input, or a combination thereof. For example, the statistical module 508 can determine the n-gram size 218 as four characters based on a selection by a user of the navigation system 100 or a network administrator.

The statistical module 508 can calculate the individual n-gram count 304 by splitting character strings in the map data 208 into overlapping instances of the n-grams 216 of FIG. 2. For example, the statistical module 508 can split the character string "Duarte" into the trigrams "Dua", "uar", "art", and "rte". The statistical module 508 can continue splitting the character strings until encountering a string delimiter such as a punctuation, a space, a symbol, or a combination thereof. The statistical module 508 can move on to the next character string after encountering the string delimiter. The string delimiters can be fixed or subject to manipulation. For example, the string delimiter can be fixed by the map data 208, added by the navigation system 100, or a combination thereof.

The statistical module 508 can store the n-grams 216 obtained from this process in a storage unit. For example, the statistical module 508 can store the n-grams 216 in the first storage unit 414, the second storage unit 446, another storage unit coupled to the navigation system 100, or a combination thereof.

The statistical module 508 can associate a counter with each unique instance of the n-grams 216 obtained from the map data 208. The statistical module 508 can determine the n-gram as the unique instance of the n-grams 216 when the n-gram does not match any of the n-grams 216 stored in the storage unit. The statistical module 508 can increment the counter by one at the outset. The statistical module 508 can also compare each successive instance of the n-grams 216 obtained after the first n-gram with the n-grams 216 stored in the storage unit. The statistical module 508 can increment the counter by one when successive instances of the n-grams 216 obtained after the initial n-gram matches any of the stored instances of the n-grams 216.

The statistical module 508 can calculate the individual n-gram count 304 based on a final value of the counter. The statistical module 508 can calculate the individual n-gram count 304 for each of the n-grams 216 obtained from the map data 208. The statistical module 508 can calculate the individual n-gram count 304 as the final value of the counter once the map data 208, or a portion therein, has been analyzed.

The statistical module 508 can also calculate the total n-gram count 306 by counting or adding all instances of the individual n-gram count 304 once the map data 208, or a portion therein, has been analyzed. The statistical module 508 can calculate the n-gram probabilities 308 based on the individual n-gram count 304 and the total n-gram count 306. The statistical module 508 can calculate the n-gram probabilities 308 by dividing the individual n-gram count 304 by the total n-gram count 306. The statistical module 508 can calculate the n-gram probabilities 308 for each of the n-grams 216 obtained from the map data 208.

The statistical module 508 can generate the n-gram frequency set 302 by organizing the individual n-gram count 304, the total n-gram count 306, the n-gram probabilities 308 for each of the n-grams 216 obtained from the map data 208. For example, the statistical module 508 can generate the n-gram frequency set 302 as a relational database, an array database, a key-value database, a columnar database, an object orientated database, or a combination thereof. As a more specific example, the statistical module 508 can generate the n-gram frequency set 302 as a list array, a hierarchical array, or a combination thereof.

The frequency module 506 can also include the biasing module 510. The biasing module 510 is configured to generate the biasing entries 330 of FIG. 3 for inclusion into the map data 208. The biasing module 510 can generate the biasing entries 330 for increasing the individual n-gram count 304 associated with the biasing entries 330.

The biasing module 510 can generate the biasing entries 330 based on the map data 208, the geographic region 206, or a combination thereof. More specifically, the biasing module 510 can generate the biasing entries 330 based on a linguistic or thematic concentration of words or phrases included in the map data 208 pertaining to a particular region or area. The biasing module 510 can generate the biasing entries 330 for a particular instance of the geographic region 206 such as a state or province, a county, a city or township, or a neighborhood. The biasing module 510 can generate the biasing entries 330 by including or incorporating the biasing entries 330 into the map data 208 for the particular instance of the geographic region 206.

The biasing module 510 can generate the biasing entries 330 based on the linguistic origin of words or phrases in the map data 208 related to one or more instances of the geographic region 206. For example, the map data 208 can include words or phrases derived from surnames or expressions of a particular ethnic or linguistic group. As a more specific example, the map data 208 can include street names derived from surnames or words in German, Italian, French, Creole, Spanish, or a combination thereof. In these examples, the biasing entries 330 can include a selection of correctly spelled words or phrases from the particular ethnic or linguistic group.

The biasing module 510 can generate the biasing entries 330 to increase the likelihood of the navigation system 100 not detecting the words of phrases of the particular ethnic or linguistic group as the potential spelling errors 220 of FIG. 2. The biasing module 510 can generate the biasing entries 330 statically or dynamically. For example, the biasing module 510 can generate the biasing entries 330 by retrieving or receiving the selection of correctly spelled words or phrases from a dictionary database, a language database, a name database, or a combination thereof. The biasing entries 330 can be predetermined by the navigation system 100 or generated on the fly based on the geographic region 206.

For example, the geographic region 206 can be a predominantly Italian neighborhood where the street, POI, or landmark names are derived from Italian surnames. In this example, the biasing module 510 can generate the biasing entries 330 by incorporating or adding a selection of correctly spelled Italian words into the map data 208. The biasing module 510 can incorporate this selection of correctly spelled Italian words into the map data 208 to increase the individual n-gram count 304 of the n-grams 216 contained in such words.

The biasing module 510 can also generate the biasing entries 330 based on the thematic concentration of words or phrases in the map data 208 related a particular instance of the geographic region 206. For example, the map data 208 can include words or phrases based on types of plants, animals, or colleges. As a more specific example, the map data 208 can include street names based on types of trees, flowers, or a combination thereof.

The biasing module 510 can generate the biasing entries 330 to increase the likelihood of the navigation system 100 distinguishing the words or phrases of the particular thematic group from the potential spelling errors 220. The biasing module 510 can generate the biasing entries 330 by including or incorporating a selection of correctly spelled words or phrases associated with the thematic concentration into the map data 208 for the particular instance of the geographic region 206. For example, the biasing module 510 can generate the biasing entries 330 by incorporating or adding a selection of correctly spelled flower names to the map data 208 for a particular neighborhood where the street names of the neighborhood are based on flower names.

The biasing module 510 can store the biasing entries 330 in the first storage unit 414, the second storage unit 446, or a combination thereof. The biasing module 510 can also include the biasing entries 330 as part of the n-gram frequency set 302.

The frequency module 506 can be part of the first software 426, the second software 442, or a combination thereof. The first control unit 412 can execute the first software 426, the second control unit 434 can execute the second software 442, or a combination thereof to generate the n-gram frequency set 302.

Moreover, the frequency module 506 can also communicate the n-gram frequency set 302 between devices through the first communication unit 416, the second communication unit 436, or a combination thereof. After generating the n-gram frequency set 302, the control flow can pass from the frequency module 506 to the target module 512.

The target module 512 is configured to calculate the target occurrence rate 314 of FIG. 3. The target module 512 can calculate the target occurrence rate 314 for detecting the potential spelling errors 220 in the map data 208, the search query 210, or a combination thereof. More specifically, the target module 512 can calculate the target occurrence rate 314 for detecting the potential spelling errors 220 in the target segment 212 of FIG. 2 included in the map data 208, the search query 210, or a combination thereof. The target module 512 can calculate the target occurrence rate 314 based on the n-gram probabilities 308 included in the n-gram frequency set 302.

The target module 512 can determine the target window 310 of FIG. 3 for analyzing the n-grams 216 within the target segment 212. The target module 512 can retrieve the target segment 212 from the first storage unit 414, the second storage unit 446, or a combination thereof. The target segment 212 can include one or more words or phrases identified or extracted from the map data 208, the search query 210, or a combination thereof. The target module 512 can determine the target window 310 by determining the window size 312 of FIG. 3 of the target window 310. As previously discussed, the window size 312 can be the actual number of the characters 214 in the target window 310. The window size 312 can equal or exceed the n-gram size 218.

The target module 512 can determine the window size 312 based on the n-gram size 218, the error threshold 316 of FIG. 3, or a combination thereof. The target module 512 can set the window size 312 of the target window 310 to encompass multiple instances of the n-grams 216. In addition, the target module 512 can set the window size 312 of the target window 310 to encompass overlapping instances of the n-grams 216.

For example, the target segment 212 can include the words "Dooliittle Ave" and the window size 312 of the target window 310 can be four characters. In this example, the target window 310 can encompass portions of the target segment 212 including "Dool", "ooli" "olii", "liit", "iitt", "ittl", "ttle", "tle_", "le_A", "e_Av", and "_Ave". Also, in this example, the target window 310 encompassing the character string "Hit" can include trigrams "lii" and "iit".

The target module 512 can calculate the target occurrence rate 314 for the target window 310. More specifically, the target module 512 can calculate the target occurrence rate 314 for the arrangement of the characters 214 within the target window 310. The target module 512 can calculate the target occurrence rate 314 for detecting the potential spelling errors 220 within the target window 310.

The target module 512 can calculate the target occurrence rate 314 based on the n-gram probabilities 308 associated with the n-grams 216 encompassed by the target window 310. The target module 512 can calculate the target occurrence rate 314 by multiplying the n-gram probabilities 308 associated with the n-grams 216 encompassed by the target window 310.

For example, the target window 310 can encompass the character string "Hit" in the target segment 212 "Dooliittle Ave". In this example, the target window 310 can also include the overlapping trigrams "lii" and "iit". Based on this example, the target module 512 can calculate the target occurrence rate 314 by multiplying the n-gram probabilities 308 associated with the trigrams "lii" and "iit".

Once the target module 512 has calculated the target occurrence rate 314 for one portion of the target segment 212, the target module 512 can slide the target window 310 to a different portion of the target segment 212. The target module 512 can slide the target window 310 to a different portion of the target segment 212 by encompassing different character strings within the target segment 212 using the target window 310. The target module 512 can slide the target window 310 in a left or right direction by the singular character 320 of FIG. 2 or multiple characters.

Continuing with the example above, the target module 512 can slide the target window 310 to the character string "iitt" after determining the target occurrence rate 314 for the character string "Hit". The target module 512 can then calculate the target occurrence rate 314 of the different portion of the target segment 212. The target module 512 can store instances of the target occurrence rate 314 in the first storage unit 414, the second storage unit 446, or a combination thereof. The target module 512 can continue sliding the target window 310 over the target segment 212 until the target window 310 reaches a string delimiter. As previously discussed, the string delimiter can include a punctuation, a space, a symbol, or a combination thereof.

The target module 512 can be part of the first software 426, the second software 442, or a combination thereof. The first control unit 412 can execute the first software 426, the second control unit 434 can execute the second software 442, or a combination thereof to calculate the target occurrence rate 314.

Moreover, the target module 512 can also communicate the target occurrence rate 314 between devices through the first communication unit 416, the second communication unit 436, or a combination thereof. The target module 512 can use the first communication interface 428 of FIG. 4, the second communication interface 450 of FIG. 4, or a combination thereof to communicate the target occurrence rate 314. After calculating the target occurrence rate 314, the control flow can pass from the target module 512 to the error module 514.

The error module 514 is configured to detect the potential spelling errors 220 in the map data 208, the search query 210, or a combination thereof. The error module 514 can detect the potential spelling errors 220 for further processing or notifying a user or device of the navigation system 100 of the potential spelling errors 220. The error module 514 can detect the potential spelling errors 220 based on the error threshold 316 of FIG. 3 and the target occurrence rate 314.

The error module 514 can detect the potential spelling errors 220 by comparing the target occurrence rate 314 with the error threshold 316. The error module 514 can detect the potential spelling errors 220 in the map data 208 by comparing the target occurrence rate 314 of each of the character strings in the map data 208 with the error threshold 316.

The error module 514 can detect the potential spelling errors 220 when the target occurrence rate 314 is equal to or below the error threshold 316. The error module 514 can detect the potential spelling errors 220 as located within the target window 310 associated with the target occurrence rate 314.

The error module 514 can detect the potential spelling errors 220 by tagging the target segment 212 as containing the potential spelling errors 220. In addition, the error module 514 can store the tagged instance of the target segment 212 in the first storage unit 414, the second storage unit 446, or a combination thereof.

For example, the error threshold 316 for the map data 208 can be set at 0.0000000001. In this example, the target occurrence rate 314 of the target window 310 encompassing the character string "liit" can also be equal to 0.0000000001. Based on this example, the error module 514 can tag the words "Dooliittle Ave" as containing the potential spelling errors 220. In addition, the error module 514 can also store the words "Dooliittle Ave" in the first storage unit 414, the second storage unit 446, or a combination thereof.

The error threshold 316 can be predetermined by the navigation system 100. In addition, the error threshold 316 can be determined based on the size of the map data 208, the geographic region 206, the biasing entries 330 incorporated into the map data 208, or a combination thereof.

The error threshold 316 can also depend on the window size 312. The error module 514 can adjust the error threshold 316 when an adjustment is made to the window size 312 of the target window 310. The error module 514 can decrease the error threshold 316 by two or more orders-of-magnitude 318 of FIG. 3 when the window size 312 is increased by the singular character 320. For example, the error module 514 can decrease the error threshold 316 by four orders-of-magnitude 318 when the window size 312 is decreased by the singular character 320.

The error module 514 can be part of the first software 426, the second software 442, or a combination thereof. The first control unit 412 can execute the first software 426, the second control unit 434 can execute the second software 442, or a combination thereof to detect the potential spelling errors 220.

Moreover, the error module 514 can also communicate the potential spelling errors 220 between devices through the first communication unit 416, the second communication unit 436, or a combination thereof. The target module 512 can use the first communication interface 428, the second communication interface 450, or a combination thereof to communicate the potential spelling errors 220. After detecting the potential spelling errors 220, the control flow can pass from the error module 514 to the accuracy module 516.

The accuracy module 516 is configured to determine the accuracy level 326 of FIG. 3 of the map data 208. The accuracy module 516 can determine the accuracy level 326 for evaluating the quality of the map data 208 received or retrieved from multiple sources or vendors. For example, the navigation system 100 can receive or retrieve multiple instances of the map data 208 from different sources or vendors for the same geographic location or area.

As a more specific example, the navigation system 100 can receive or retrieve one instance of the map data 208 from a free crowd-sourced database and another instance of the map data 208 from a paid database. In this example, the accuracy module 516 can evaluate the quality of the free crowd-sourced database and the paid database by determining the accuracy level 326 of the map data 208 received or retrieved from each of the databases.

The accuracy module 516 can determine the accuracy level 326 based on the error threshold 316, the potential spelling errors 220, the artificial error count 322 of FIG. 3, the actual error count 324 of FIG. 3, or a combination thereof. The accuracy module 516 can set the error threshold 316 with the potential spelling errors 220 satisfying the artificial error count 322. The accuracy module 516 can set the error threshold 316 based on adjusting the error threshold 316 resulting in the potential spelling errors 220 satisfying the artificial error count 322.

In addition, the accuracy module 516 can set the error threshold 316 by adjusting the error threshold 316 until the amount of the potential spelling errors 220 equals the artificial error count 322. The potential spelling errors 220 can satisfy the artificial error count 322 when an amount or number of the potential spelling errors 220 equals or exceeds the artificial error count 322.

The artificial error count 322 can be predetermined by the navigation system 100. In addition, the artificial error count 322 can be adjusted based on the geographic region 206, the size of the map data 208, or a combination thereof. For example, the artificial error count 322 can be set at 5000 potentially misspelled words or phrases. In this example, the accuracy module 516 can either raise or lower the error threshold 316 until the number of the potential spelling errors 220 detected in the map data 208 equals 5000.

The accuracy module 516 can determine the actual error count 324 from the potential spelling errors 220. The accuracy module 516 can determine the actual error count 324 by removing the false positive results 328 from the potential spelling errors 220. The false positive results 328 can be infrequent but correctly spelled instances of the target segment 212 detected by the navigation system 100 as the potential spelling errors 220. The accuracy module 516 can remove the false positive results 328 by identifying and deleting the false positive results 328 from the potential spelling errors 220.

The accuracy module 516 can identify the false positive results 328 based on an input from a user such as a map administrator or network administrator. In addition, the accuracy module 516 can identify the false positive results 328 by comparing the potential spelling errors 220 with known or verified geographic identifiers or names from a GIS database, a GNIS database, a GeoNames database, or a combination thereof.

The accuracy module 516 can determine the actual error count 324 by counting the potential spelling errors 220 after removing the false positive results 328. The accuracy module 516 can determine the accuracy level 326 of the map data 208 based on the actual error count 324. The accuracy module 516 can determine the accuracy level 326 of the map data 208 received or retrieved from multiple sources by comparing the actual error count 324 in the map data 208 received or retrieved from each of the sources.

For example, the accuracy module 516 can determine the actual error count 324 of the map data 208 received from the free crowd-sourced database as 3000 errors out of 5000 of the potential spelling errors 220. Also, in this example, the accuracy module 516 can determine the actual error count 324 of the map data 208 received from the paid database as 1000 errors out of 5000 of the potential spelling errors 220. Based on this example, the accuracy module 516 can determine the accuracy level 326 of the paid database as more accurate than the accuracy level 326 of the free crowd-sourced database.

The accuracy module 516 can be part of the first software 426, the second software 442, or a combination thereof. The first control unit 412 can execute the first software 426, the second control unit 434 can execute the second software 442, or a combination thereof to determine the accuracy level 326 of the map data 208.

Moreover, the accuracy module 516 can also communicate the accuracy level 326 of the map data 208 between devices through the first communication unit 416, the second communication unit 436, or a combination thereof. After determining the accuracy level 326 of the map data 208, the control flow can pass from the accuracy module 516 to the notification module 518.

The notification module 518 is configured to communicate the potential spelling errors 220 to a user of the navigation system 100, a device coupled to the navigation system 100, or a combination thereof. The notification module 518 can communicate the potential spelling errors 220 using visual graphics, audio communication, haptic feedback, or a combination thereof.

The notification module 518 can communicate the potential spelling errors 220 by generating a notification window displaying the potential spelling errors 220. For example, the notification module 518 can generate the notification window as a pop up window, a frame window, an alert window, or a combination thereof. As a more specific example, the notification module 518 can generate the notification window to inform a user or a system administrator of the potential spelling errors 220.

The notification module 518 can also communicate the potential spelling errors 220 by generating an audio cue concerning the potential spelling errors 220. The notification module 518 can use the first user interface 418 of FIG. 4, the second user interface 438 of FIG. 4, or a combination thereof to communicate the potential spelling errors 220.

Moreover, the notification module 518 can communicate the potential spelling errors 220 by identifying the potential spelling errors 220 in the search query 210. For example, the notification module 518 can identify the potential spelling errors 220 in the search query 210 by highlighting the target window 310 or the n-grams 216 containing the potential spelling errors 220.

Also, the notification module 518 can identify the potential spelling errors 220 in the search query 210 by generating haptic feedback to a user as the user types the search query 210. For example, the haptic feedback can include a vibrational feedback, a touch-coordinate feedback, or a combination thereof. The notification module 518 can generate the haptic feedback when the user inputs a character string containing the potential spelling errors 220.

The notification module 518 can also communicate the potential spelling errors 220 to other devices in or coupled to the navigation system 100. The notification module 518 can use the first communication unit 416, the second communication unit 436, or a combination thereof to communicate the potential spelling errors 220 between devices.

The notification module 518 can be part of the first software 426, the second software 442, or a combination thereof. The first control unit 412 can execute the first software 426, the second control unit 434 can execute the second software 442, or a combination thereof to communicate the potential spelling errors 220.

The physical transformation of the navigation system 100 detecting the potential spelling errors 220 in the search query 210, the map data 208, or a combination thereof results in movement in the physical world, such as people using the first device 102 of FIG. 1 to locate addresses, POIs, or events using the navigation system 100. As the movement in the physical world occurs, the movement itself creates additional information that is converted back into the map display portion 204 that is displayable on the display interface 202 for the continued operation of the navigation system 100 and to continue movement in the physical world.

It has been discovered that generating the n-gram frequency set 302 based on the map data 208 and the geographic region 206 provides for an improved method of detecting instances of the potential spelling errors 220 in an open-ended dataset such as street or roadway names. For example, the dataset for street names in the map data 208 can be open-ended given variations in street-naming conventions, urban planning changes, and the continuous construction of new streets and roadways. Based on the open-ended nature of the dataset for these street names, no master set of street names can be constructed which will not become obsolete as time passes. Therefore, generating the n-gram frequency set 302 based on the map data 208 currently available for a particular region allows the navigation system 100 to detect the potential spelling errors 220 based on the frequency or infrequency of the n-grams 216 included in the map data 208 relative to the total n-gram count 306.

It has been discovered that calculating the target occurrence rate 314 based on the n-gram frequency set 302 improves the accuracy of navigation instructions generated by the navigation system 100. By determining the target occurrence rate 314 based on the n-gram frequency set 302, the navigation system 100 can detect the potential spelling errors 220 in the map data 208 used to generate navigation instructions. Since navigation systems often incorporate words or phrases from the map data 208 into navigation instructions, including text-to-speech navigation instructions, generated for users, catching spelling errors in the map data 208 can improve the accuracy and quality of such navigation instructions.

It has been discovered that determining the accuracy level 326 of the map data 208 based on the actual error count 324, the error threshold 316, the potential spelling errors 220, or a combination thereof provides for an improved method of determining the quality of vendor-supplied map information. For example, multiple instances of the map data 208 can be received or retrieved by the navigation system 100 concerning the same geographic area or region. By determining the actual error count 324 from the potential spelling errors 220 detected from multiple instances of the map data 208, the navigation system 100 can determine the accuracy level 326 of each instance of the map data 208 by comparing the map data 208 against its cohorts.

It has been discovered that identifying the potential spelling errors 220 in the search query 210 based on the target occurrence rate 314 and the error threshold 316 provides for a more personalized navigation search experience. For example, by highlighting the potential spelling errors 220 in the search query 210 provided by a user, the navigation system 100 can provide real-time feedback to the user concerning the accuracy of search terms and prevent the search query 210 from yielding incorrect results.

The modules describes in this application can be ordered or partitioned differently. For example, certain modules can be combined. Each of the modules can also operate individually and independently of the other modules. Furthermore, data generated in one module can be used by another module without being directly coupled to each other.

The modules described in this application can be implemented by hardware circuitry or hardware acceleration units (not shown) in the control units. The modules described in this application can also be implemented by separate hardware units (not shown), including hardware circuitry, outside the control units but with the first device 102 or the second device 106.

For illustrative purposes, the various modules have been described as being specific to the first device 102, the second device 106, or a combination thereof. However, it is understood that the modules can be distributed differently. For example, the various modules can be implemented in a different device, or the functionalities of the modules can be distributed across multiple devices.

The modules described in this application can be implemented as instructions stored on a non-transitory computer readable medium to be executed by a first control unit 412, the second control unit 434, or a combination thereof. The non-transitory computer medium can include the first storage unit 414, the second storage unit 446, or a combination thereof. The first storage unit 414, the second storage unit 446, or a combination thereof, or a portion therein can also be made removable from the first device 102, the second device 106, or a combination thereof.

The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the navigation system 100 or installed as a removable portion of the navigation system 100.

As a more specific example, one or more modules described above can be stored in the non-transitory memory medium for distribution to a different system, a different device, a different user, or a combination thereof. Also as a more specific example, the modules described above can be implemented or stored using a single hardware unit, such as a chip or a processor, or across multiple hardware units.

Figure 6:
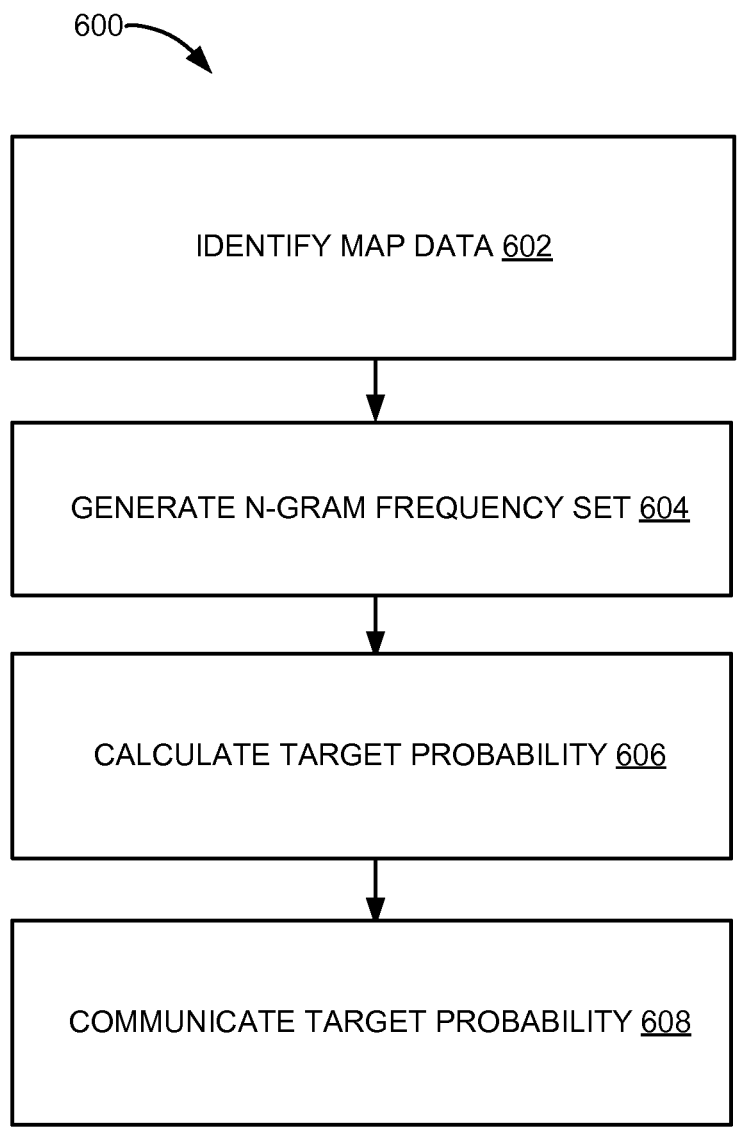
FIG. 6 is a flow chart of a method of operation of the navigation system in a further embodiment of the present invention.

Referring now to FIG. 6, therein is shown a flow chart of a method 600 of operation of the navigation system 100 of FIG. 1 in a further embodiment of the present invention. The method 600 includes identifying, with the control unit 212 of FIG. 2, the map data 208 of FIG. 2 for the geographic region 206 of FIG. 2 in a block 602; generating the n-gram frequency set 302 of FIG. 3 based on the map data 208 and the geographic region 206 in a block 604; calculating the target occurrence rate 314 of FIG. 3 for detecting one or more of the potential spelling errors 220 of FIG. 2 in the map data 208 based on the n-gram frequency set 302 in a block 606; and communicating, with the communication interface 428 coupled to the control unit 212, the target occurrence rate 314 in a block 608.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A navigation system comprising:
 a control unit configured to:
  identify map data for a geographic region;
  generate an n-gram frequency set based on the map data and the geographic region;
  calculate a target occurrence rate for detecting one or more potential spelling errors in the map data based on the n-gram frequency set; and
 a communication interface, coupled to the control unit, and configured to communicate the target occurrence rate.

2. The system as claimed in claim 1 wherein the control unit is further configured to:
 calculate an individual n-gram count based on the map data;
 calculate a total n-gram count based on the map data; and
 calculate n-gram probabilities associated with the n-gram frequency set for detecting the potential spelling errors based on the individual n-gram count and the total n-gram count.

3. The system as claimed in claim 1 wherein the control unit is further configured to:
 determine a target window for analyzing overlapping instances of n-grams within a target segment in the map data;
 calculate n-gram probabilities corresponding to the overlapping instances of the n-grams within the target window; and
 calculate the target occurrence rate based on the n-gram probabilities and the target window.

4. The system as claimed in claim 1 wherein the control unit is further configured to:
 set an error threshold for satisfying an artificial error count based on the potential spelling errors;
 determine an actual error count from the potential spelling errors; and
 determine an accuracy level of the map data based on the actual error count, the error threshold, the potential spelling errors, or a combination thereof.

5. The system as claimed in claim 1 wherein the control unit is further configured to generate biasing entries for inclusion into the map data for increasing an individual n-gram count associated with the biasing entries.

6. The system as claimed in claim 1 wherein the control unit is further configured to decrease an error threshold by two or more orders-of-magnitude when a window size of the target window is increased by a singular character.

7. The system as claimed in claim 1 wherein the control unit is further configured to determine an n-gram size based on the geographic region.

8. The system as claimed in claim 1 wherein the control unit is further configured to determine the geographic region based on a map display portion.

9. The system as claimed in claim 1 wherein the control unit is further configured to identify the potential spelling errors in a search query based on the target occurrence rate and an error threshold.

10. The system as claimed in claim 1 wherein the control unit is further configured to compare the target occurrence rate with an error threshold for detecting the potential spelling errors in the map data.

11. A method of operation of a navigation system comprising:
 identifying, with a control unit, a map data for a geographic region;
 generating an n-gram frequency set based on the map data and the geographic region;
 calculating a target occurrence rate for detecting one or more potential spelling errors in the map data based on the n-gram frequency set; and
 communicating, with a communication interface coupled to the control unit, the target occurrence rate.

12. The method as claimed in claim 11 further comprising:
 calculating an individual n-gram count based on the map data;
 calculating a total n-gram count based on the map data; and
 calculating n-gram probabilities associated with the n-gram frequency set for detecting the potential spelling errors based on the individual n-gram count and the total n-gram count.

13. The method as claimed in claim 11 further comprising:
 determining a target window for analyzing overlapping instances of n-grams within a target segment in the map data;
 calculating n-gram probabilities corresponding to the overlapping instances of the n-grams within the target window; and
 calculating the target occurrence rate based on the n-gram probabilities and the target window.

14. The method as claimed in claim 11 further comprising:
 setting an error threshold for satisfying an artificial error count based on the potential spelling errors;
 determining an actual error count from the potential spelling errors; and
 determining an accuracy level of the map data based on the actual error count, the error threshold, the potential spelling errors, or a combination thereof.

15. The method as claimed in claim 11 further comprising generating biasing entries for inclusion into the map data for increasing an individual n-gram count associated with the biasing entries.

16. A non-transitory computer readable medium including instructions for execution, comprising:
 identifying a map data for a geographic region;
 generating an n-gram frequency set based on the map data and the geographic region;
 calculating a target occurrence rate for detecting one or more potential spelling errors in the map data based on the n-gram frequency set; and
 communicating the target occurrence rate.

17. The non-transitory computer readable medium as claimed in claim 16 further comprising:
 calculating an individual n-gram count based on the map data;
 calculating a total n-gram count based on the map data; and calculating n-gram probabilities associated with the n-gram frequency set for detecting the potential spelling errors based on the individual n-gram count and the total n-gram count.

18. The non-transitory computer readable medium as claimed in claim 16 further comprising:
   determining a target window for analyzing overlapping instances of n-grams within a target segment in the map data;
   calculating n-gram probabilities corresponding to the overlapping instances of the n-grams within the target window; and
   calculating the target occurrence rate based on the n-gram probabilities and the target window.

19. The non-transitory computer readable medium as claimed in claim 16 further comprising:
   setting an error threshold for satisfying an artificial error count based on the potential spelling errors;
   determining an actual error count from the potential spelling errors; and
   determining an accuracy level of the map data based on the actual error count, the error threshold, the potential spelling errors, or a combination thereof.

20. The non-transitory computer readable medium as claimed in claim 16 further comprising generating biasing entries for inclusion into the map data for increasing an individual n-gram count associated with the biasing entries.

* * * * *